US012260243B2

(12) United States Patent
Kuehberger et al.

(10) Patent No.: US 12,260,243 B2
(45) Date of Patent: Mar. 25, 2025

(54) METHOD FOR OPERATING A MICROCONTROLLER

(71) Applicant: Robert Bosch GmbH, Stuttgart (DE)

(72) Inventors: Georg Kuehberger, Michelhausen (AT); Bernhard Plametzberger, Vienna (AT); Dirk Lentz, Stuttgart (DE); Matthias Knauss, Schorndorf (DE); Matthias Schreiber, Vaihngen/Enz (DE); Philipp Stark, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 487 days.

(21) Appl. No.: 17/674,320

(22) Filed: Feb. 17, 2022

(65) Prior Publication Data

US 2022/0269525 A1 Aug. 25, 2022

(30) Foreign Application Priority Data

Feb. 24, 2021 (DE) .................... 10 2021 104 419.7

(51) Int. Cl.
*G06F 9/455* (2018.01)
(52) U.S. Cl.
CPC ................ *G06F 9/45558* (2013.01)

(58) Field of Classification Search
CPC ............... G06F 9/45558; G06F 9/5083; G06F 2009/45579; G06F 9/45533; G06F 9/5027; G06F 2009/45587
See application file for complete search history.

(56) References Cited

U.S. PATENT DOCUMENTS

| 2008/0086729 | A1* | 4/2008 | Kondoh | G06F 9/5077 718/1 |
| 2011/0029971 | A1* | 2/2011 | Yamasaki | G06F 9/45558 718/1 |
| 2017/0048249 | A1* | 2/2017 | Berrangé | H04L 63/102 |
| 2019/0294477 | A1* | 9/2019 | Koppes | G06F 9/5072 |
| 2021/0132971 | A1* | 5/2021 | Szwed | G06F 9/45545 |

\* cited by examiner

*Primary Examiner* — Sisley N Kim
(74) *Attorney, Agent, or Firm* — NORTON ROSE FULBRIGHT US LLP; Gerard A. Messina

(57) ABSTRACT

A method for operating a microcontroller. The microcontroller includes a plurality of resources, a plurality of virtual machines being executed in the microcontroller, a coordination unit being superordinate to the plurality of virtual machines. Access information concerning accesses of the plurality of virtual machines to the plurality of resources is stored in the coordination unit. In the event that one of the virtual machines requests a reset of one of the resources, the coordination unit checks on the basis of the access information, which of the virtual machines are accessing this resource. The coordination unit determines on the basis of this check, whether the resource will be reset or whether a substitute measure will be taken.

10 Claims, 3 Drawing Sheets

METHOD FOR OPERATING A MICROCONTROLLER

CROSS REFERENCE

The present application claims the benefit under 35 U.S.C. § 119 of German Patent Application No. DE 10 2021 104 419.7 filed on Feb. 24, 2021, which is expressly incorporated herein by reference in its entirety.

FIELD

The present invention relates to a method for operating a microcontroller and to a microcontroller and to a computer program for implementing the method.

BACKGROUND INFORMATION

Modern microcontrollers, as they are used in (motor) vehicles for example, offer the possibility of implementing virtual machines. The term "virtual machine" denotes a hypothetical computer system (possibly including hardware, operating system and software), which is emulated in another host computer system.

A plurality of such virtual machines may be executed in a microcontroller, which may provide for example a separate virtual operating system and tasks to be executed by the latter. Thus it is possible to simulate a plurality of different processing units in the real physical microcontroller. A so-called hypervisor may be provided as a separate hardware and/or software unit for managing these virtual machines.

In this manner, it is possible to increase the processing power or the efficiency of the microcontroller in a cost-effective manner, without expanding the microcontroller by adding physical, real resources. Instead, the existing physical resources of the microcontroller may be distributed to the virtual machines and used by these jointly.

SUMMARY

The present invention provides a method for operating a microcontroller as well as a microcontroller and a computer program for implementing the method. Advantageous developments of the present invention are disclosed herein.

The microcontroller comprises a plurality of resources, in particular a processor unit having a plurality of processor cores and further in particular a plurality of further hardware and/or software resources, for example memory units such as RAM memories, flash memories etc., and peripheral units, e.g. an analog-digital converter, terminals for a bus system or field bus system (e.g. CAN, LIN, SPI) etc.

In accordance with an example embodiment of the present invention, a plurality of virtual machines is executed in the microcontroller. In particular, these virtual machines are implemented in software and are expediently executed by the plurality of processor cores. The virtual machines share the resources of the microcontroller and are expediently able to access these resources jointly. In particular, in each of these individual virtual machines, an operating system (OS), such as, e.g., RTA OS, is executed as well as further base software required for the operation and for a basic functionality or basic function, e.g., AUTOSAR and other safety-related software. Under these operating systems, executable software or application software may be executed in the individual virtual machines. The virtual machines further respectively comprise in particular a plurality of drivers or base software drivers, which are required for executing an action or functionality to be carried out by the microcontroller. This plurality of base software drivers is also called a base software stack. A hypervisor is expediently provided for managing the virtual machines, which may be provided in the microcontroller as a separate hardware and/or software unit.

In accordance with an example embodiment of the present invention, the microcontroller further has a coordination unit, which is superordinate to the plurality of virtual machines. In particular, the coordination unit may be provided in software and be executed for example by the processor unit of the microcontroller. Alternatively or additionally, the coordination unit may be implemented in the microcontroller in particular as a separate, individual hardware unit. This coordination unit is provided in particular as a central, common coordinator, which coordinates and manages the reset or the restart of individual resources of the microcontroller upon query or request of the individual virtual machines.

Access information regarding the accesses of the plurality of virtual machines to the plurality of resources is stored in the coordination unit. In particular, the access information provides information about which virtual machines access which resources during the run time of the microcontroller or which resources are used jointly by which virtual machines during the run time of the microcontroller.

If one of the virtual machines (also referred to hereinafter as "requesting virtual machine" without limiting the universality) requests a reset of one of the resources (also referred to hereinafter as "requested resource" without limiting the universality), the coordination unit checks on the basis of the access information which of the virtual machines are still accessing this requested resource. The coordination unit checks in particular whether multiple virtual machines are currently accessing the requested resource and further in particular whether an immediate, sudden reset of this resource may negatively affect the operation of individual virtual machines or could even destabilize the entire system of the microcontroller.

In accordance with an example embodiment of the present invention, as a function of this check, the coordination unit determines or decides whether the respective requested resource is reset or whether a substitute measure or substitute action or substitute reaction is performed. If the coordination unit determines in the course of the check that a reset of the resource does not negatively affect the individual virtual machines or the microcontroller as a whole, the coordination unit expediently determines that the relevant resource is reset as requested by the respective virtual machine. On the other hand, if the check by the coordination unit reveals that a reset of the resource could have negative effects on individual virtual machines or on the entire microcontroller, the coordination unit expediently determines that the resource is at least for now not reset as requested, but that instead the respective substitute measure is taken.

If the coordination unit determines that the reset is performed, then the resource is expediently reset at the earliest possible point in time. The coordination unit itself may reset the resource, for example, or the reset may be performed by a further component of the microcontroller, for example by the hypervisor or an operating system.

In the present context, a reset of a resource is to be understood in particular both as a regular restart, that is in particular a regular shut down and subsequent boot up (also called a "warm start" or "reboot") as well as a hard or cold restart, in which no regular shut down occurs or possibly can no longer occur due to an error, but in which rather the respective resource is switched off, possibly by interrupting a current supply, and a subsequent boot up occurs (also called a "reset" or "cold start").

If an error occurs in one of the virtual machines during an access to a resource of the microcontroller, for example a serious or critical error or a so-called trap, it may be necessary to restart or reset the respective resource related to the error. The individual virtual machines, however, usually do not know which virtual machines are accessing which resources or which resources are used jointly by which virtual machines. The individual virtual machines are therefore usually not able to assess whether a reset of the respective resource may result in further errors in other virtual machines. In particular, the drivers of the base software stack of the individual virtual machines respectively contain no information as to whether or not a resource is exclusively assigned to the respective virtual machine. The base software stacks of the individual virtual machines are therefore usually not able to decide whether a reset of the respective resource may be performed at a given point in time, without a collision occurring with a further virtual machine or without the entire system being destabilized.

The present invention makes it possible to manage a reset of resources during the run time of the microcontroller and in particular to perform it in an operationally safe manner so that no errors or malfunctions in the virtual machines or indeed a destabilization of the entire microcontroller system result. Within the scope of the present invention, the decision about the reset of resources is shifted from the individual virtual machines or from the base software stacks of the individual machines into the central superordinate coordination unit. Expediently, information about the current usage of all resources by the individual virtual machines is stored together with the access information in the coordination unit at a central location in the microcontroller. Based on this access information, the coordination unit is able reliably to decide whether the reset of the respective requested resource at the current point in time is permissible or (operationally) safe or which substitute measure should instead be expediently taken. In particular, the coordination unit may perform at run time a prioritization and coordination of the requested reset or the corresponding substitute measure with respect to the executions necessary for the stability of the system.

The present method makes it possible in particular to reduce a complexity of the virtual system executed in the microcontroller. Costs may be reduced, in particular development costs of the virtual system. Expediently, only a smallest necessary part of the microcontroller is reset. Thus it is possible to increase in particular an availability of the platform as a whole.

Particularly expediently, the present method makes it possible to increase both the operational safety or functional safety as well as the security with respect to information or information technology of the microcontroller. Errors or failures due to reset resources may be avoided. In particular, it is possible to prevent possible weaknesses in the programming of a virtual machine from affecting other virtual machines of the microcontroller. Furthermore, the microcontroller may be protected against certain kinds of attacks. For example, it is possible to prevent DoS (denial of service) attacks by reset trigger from outside against the entire integration platform.

The access information advantageously comprises authorization information regarding which virtual machines are permitted to access which resources of the microcontroller or which resources are assigned to which virtual machines. This authorization information describes in particular access authorizations, according to which the particular virtual machines are permitted to access specified resources. In particular, this authorization information is static information or fixed requirements, which do not change during the run time of the microcontroller or change at least barely or only seldom. For example, the respective access authorizations may be originally specified in the course of a manufacturing process or an initialization or configuration phase of the microcontroller. For example the access authorizations may be changed in the later operation of the microcontroller in the course of updates, for example in the course of FOTA ("firmware-over-the-air") remote updates. During the regular, continuous operation of the microcontroller, in particular between a regular boot up and shut down, the access authorizations in particular do not change. For example, the respective authorization information may be stored in the coordination unit during the manufacturing or initialization process or in the course of the respective update and/or may be read in for example by the coordination unit during the run time of the microcontroller.

Alternatively or additionally, the access information comprises advantageously state information regarding which virtual machines are accessing which resources of the microcontroller during the current run time of the microcontroller. While the authorization information describes in particular which resources the individual virtual machines are permitted to access at least in principle, the state information describes expediently, which resources the individual virtual machines are currently actually accessing. The state information thus concern in particular the current access behavior of the individual virtual machines, which may change dynamically during the run time.

According to a preferred specific embodiment of the present invention, the coordination unit determines the access information at least partially during the run time or during the current operation of the microcontroller. In particular, the state information, which may change dynamically during the operation of the microcontroller, is determined by the coordination unit during the run time and expediently updated at regular intervals. The coordination unit may for example read in the respective access information from the individual virtual machines and/or request it from the latter. Alternatively or additionally, the individual virtual machines may also transmit the respective access information to the coordination unit, for example.

The individual virtual machines preferably each comprise a subordinate coordination unit or a subordinate coordination module, which is respectively subordinate to the coordination unit. The subordinate coordination units expediently cooperate with the superordinate coordination unit for resetting microcontroller resources. In particular, the subordinate coordination units are in a (communication) connection with the superordinate coordination unit. If the respective requesting virtual machine requests the reset of the respective resource, the subordinate coordination unit of this requesting virtual machine is able for example to transmit the respective query to the superordinate coordination unit.

In particular, these subordinate coordination units are respectively provided as executable software in a base software or in a base software stack of the respective virtual machine, e.g., AUTOSAR. Particularly expediently, the superordinate coordination unit together with the individual subordinate coordination units forms a system for the safe reset of resources in the system of virtual machines. For example, the superordinate coordination unit and the subordinate coordination units may be implemented in the software architecture of the microcontroller respectively as drivers, for example as so-called "complex device drivers" (CCD) in the AUTOSAR software architecture.

The individual subordinate coordination units preferably respectively transmit the access information concerning the respective virtual machine, in particular the state information concerning the respective virtual machine, to the superordinate coordination unit. The subordinate coordination units thus make it possible always to store all information about the current usage of the resources by the individual virtual machines in the superordinate coordination unit.

In accordance with an example embodiment of the present invention, in response to the request of the requesting virtual machine to reset the queried resource, the coordination unit advantageously checks on the basis of the access information, whether or not the requesting virtual machine is permitted to access the queried resource. A check is performed in particular to determine whether the requesting virtual machine is at all authorized to access the respective resource and to initiate a reset of the resource. If this is not the case, this could indicate a possible error in the requesting virtual machine itself or even an attack from outside. In this case, the requesting virtual machine itself may be reset as a substitute measure for example and/or an error message may be output for example, e.g., to an operating system of the microcontroller, and/or an entry in an error memory or onboard error memory of the virtual machine may be produced for example.

Alternatively or additionally, the coordination unit advantageously checks in response to the request, which of the virtual machines is currently accessing the resource. A check is thus performed in particular to determine, whether, aside from the requesting virtual machine, other virtual machines are permitted at least in principle to access the respective resource and are currently actually accessing the respective resource during the run time of the microcontroller.

If the coordination unit determines as a result of the check that currently only the requesting virtual machine accesses the resource, then the coordination unit preferably determines that the resource is reset. In this case, there is in particular no risk of a collision with another virtual machine, so that the resource may be reset as requested.

In accordance with an example embodiment of the present invention, if the coordination unit determines as a result of the check that currently several of the virtual machines are accessing the resource, then the coordination unit preferably determines that the substitute measure is taken. Since in this case currently multiple virtual machines are accessing the requested resource, an immediate reset could possibly result in errors in these virtual machines.

Advantageously, the requesting virtual machine is reset as the substitute measure. If, for example, only this requesting virtual machine requests a reset of the respective resource, even though multiple virtual machines are currently accessing this resource, then this could indicate that there is no error of the resource itself, but rather that there is an error occurring in the requesting virtual machine, which may be corrected by resetting the virtual machine.

Alternatively or additionally, several of the virtual machines are preferably reset as the substitute measure. For example, it is possible to reset all virtual machines that are permitted to access or are currently accessing the requested resource.

Alternatively or additionally, preferably a message is transmitted to all virtual machines that are currently accessing the requested resource. In particular, these virtual machines may be informed that the respective resource is to be reset. Further, these virtual machines may be instructed for example to end the access to the respective resource. If, for example, each of these notified virtual machines responds to the message and confirms that it terminated the access to the resource, the resource may be reset as requested.

According to a particularly preferred specific embodiment of the present information, the coordination unit is executed by a hypervisor. In particular, the hypervisor may be provided in the microcontroller in software and be executed for example by the processor unit of the microcontroller. Alternatively or additionally, the hypervisor may be provided in particular as a separate hardware unit. The coordination unit is in particular integrated into the hypervisor and is expediently executed by the latter as software. In particular, to request the reset, the respective virtual machine may transmit a corresponding message to the hypervisor, for example an interrupt message or a so-called "hypervisor call". On account of the coordination unit provided in the hypervisor, the hypervisor in response to receiving this message is itself able to decide, whether the requested reset may be performed safely.

The coordination unit preferably receives as query for resetting the resource a message, which comprises query information, which characterizes the resetting of the resource as well as the querying virtual machine. The query information may be implemented for example as a specific argument or as multiple specific arguments in the message. The coordination unit may receive this message directly from the respective virtual machine, for example. Furthermore, the requesting virtual machine may initially also transmit a message to another component of the microcontroller, for example to the hypervisor, which then transmits the respective message to the coordination unit.

In a particularly expedient manner, the present method is suitable for real time applications or real time systems. Because the present method makes it possible to avoid errors due to reset resources and to increase a fail-safety, it is in particular possible to fulfill specified real time prerequisites or real time criteria. In particular, it is possible to use the microcontroller or the virtual machines for executing real time-capable applications.

Particularly expediently, the microcontroller may be used in a safety-critical real time environment, for example in a (motor) vehicle sector. The microcontroller may be used expediently in a (motor) vehicle. The microcontroller or the virtual machines may execute in particular safety-critical functions for safely operating and for controlling the vehicle, for example in the course of a drive or motor control or in the course of driving assistance functions etc. In particular, the present method makes it possible to fulfill safety requirements in the (motor) vehicle sector, as specified for example in the ISO 26262 standard or in particular by the so-called "Automotive Safety Integrity Level" (ASIL), a safety requirement level for safety-related systems in motor vehicle specified by ISO 26262.

A microcontroller according to an example embodiment of the present invention is configured, in particular in terms of software, to carry out a method according to the present invention.

The implementation of a method according to the present invention in the form of a computer program or computer program product having program code for performing all method steps is also advantageous, since this incurs particularly low costs, especially if an executing control unit is also used for other tasks and is therefore present anyway. Suitable storage media for providing the computer program are in particular magnetic, optical and electrical storage media such as, e.g., hard disks, flash memories, EEPROMs, DVDs and others. Downloading a program via computer networks (Internet, intranet, etc.) is also possible.

Additional advantages and developments of the present invention derive from the description and the figures.

The present invention is represented schematically in the figures based on exemplary embodiments and described below with reference to the figures.

DETAILED DESCRIPTION OF EXAMPLE EMBODIMENTS

Figure 1:
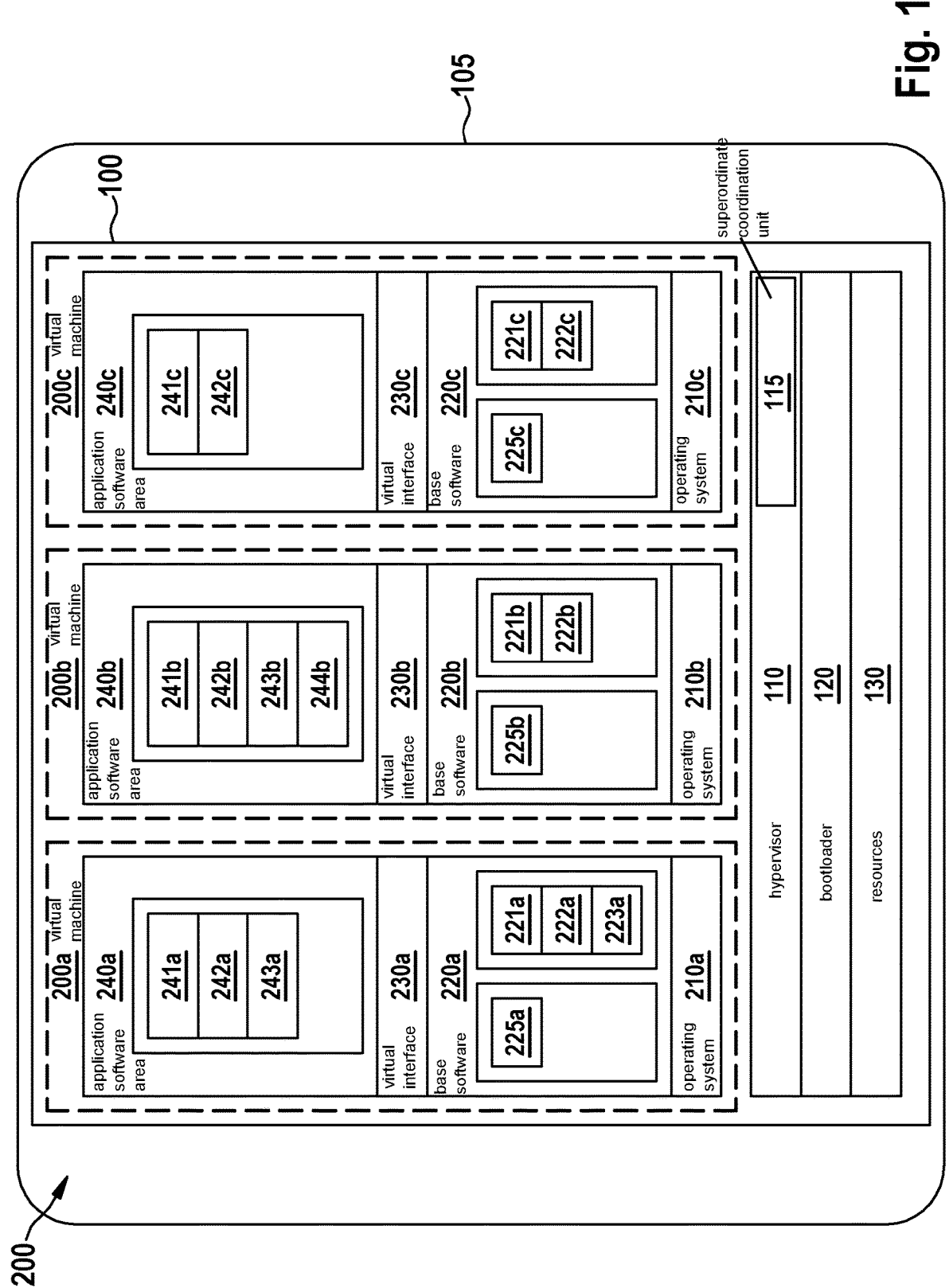
FIG. 1 shows schematically a preferred development of a microcontroller according to the present invention that is designed to carry out a preferred specific embodiment of the method according to the present invention.

FIG. 1 schematically shows a preferred development of a microcontroller according to the present invention which is indicated by reference numeral 100.

Microcontroller 100 is used for example in a (motor) vehicle, in particular in a safety-critical real time environment, for example for executing safety-critical functions, e.g. in the course of a motor control or in the course of driving assistance functions.

A plurality of virtual machines 200 is executed in microcontroller 100. In the illustrated example, three virtual machines 200a, 200b, 200c are executed in microcontroller 100. A first virtual machine 200a, for example, may be responsible for coordinating a drive torque in the course of controlling motor or drive functions. A second virtual machine 200b may be provided for example for coordinating longitudinal and lateral dynamics requirements in the course of a driver assistance function. A third virtual machine 200c may be provided, for example, as a thermal coordinator for coordinating cooling functions, which are assigned to the vehicle as a whole.

In each of the virtual machines 200a, 200b, 200c, an operating system 210a, 210b, 210c is respectively executed, e.g. respectively RTA-OS.

Furthermore, each virtual machine 200a, 200b, 200c respectively has a base software or a base software stack 220a, 220b, 220c, in which base software and drivers required for the operation and for a basic functionality or basic function and other safety-related software is executed.

For example, in the first virtual machine 200a in base software stack 220a, safety-related software applications 221a, 222a, 223a are executed, for example for coordinating the drive torque. In the second virtual machine 200b, safety-related software applications 221b and 222b are executed, for example for coordinating longitudinal and lateral dynamics requirements, and safety-related software applications 221c and 222c are executed in third virtual machine 200c, for example for coordinating the cooling functions.

Each virtual machine 200a, 200b, 200c further has respectively one connection or a virtual interface 230a, 230b, 230c for a Real-Time Ethernet (RTE) connection.

In an application software area or an application software stack 240a, 240b, 240c, software applications 241a, 242a, 243a or 241b, 242b, 243b, 244b or 241c, 242c, respectively, may be executed in the individual virtual machines 200a, 200b, 200c, for example for executing safety-critical functions of the corresponding vehicle, e.g. in the course of the motor control or the driving assistance functions.

A hypervisor 110 is provided for managing virtual machines 200a, 200b, 200c, for example in the form of software executed by microcontroller 100. Furthermore, a so-called bootloader (so-called boot control) 120 is provided for the proper booting up of microcontroller 100. This bootloader 120 is provided in particular as a software component in a software architecture 105 of microcontroller 100, in particular in an AUTOSAR software architecture.

Microcontroller 100 further includes a plurality of resources 130. In particular, microcontroller 100 includes a processor unit having a plurality of processor cores. In particular, the individual virtual machines 200a, 200b, 200c as well as hypervisor 110 are executed by this processor unit. In addition to the processor cores, microcontroller 100 includes further hardware and/or software resources, for example memory units such as RAM memories, flash memories etc., and peripheral unit, e.g., an analog-digital converter, terminals for a bus or field bus system (e.g. CAN, LIN, SPI) etc.

The individual virtual machines 200a, 200b, 200c are jointly able to access this plurality of resources 130. If an error occurs in one of the virtual machines 200 during an access to a resource 130, it may be necessary to restart or reset the respective resource 130 related to the error. In order to manage a respective reset of resources during the run time of microcontroller 100 and in particular to perform it in an operationally safe manner, microcontroller 100 is configured, in particular in terms of software, to implement a preferred specific embodiment of a method according to the present invention.

For this purpose, the microcontroller has a superordinate coordination unit 115 as well as a plurality of subordinate coordination units 225a, 225b, 225c. These coordination unit 115, 225a, 225b, 225c are respectively provided as executable software. Superordinate coordination unit 115 is executed in particular by hypervisor 115. Respectively one subordinate coordination unit 225a, 225b, 225c is executed in each virtual machine 200a, 200b, 200c, in particular in the respective base software 220a, 220b, 220c of the respective virtual machines 200a, 200b, 200c. The superordinate coordination unit 115 and the subordinate coordination units 225a, 225b, 225c are implemented for example in the software architecture 105 of microcontroller 100 respectively as drivers, for example as so-called "complex device drivers" (CDD) in the AUTOSAR software architecture.

Together with the individual subordinate coordination units 225a, 225b, 225c, the superordinate coordination unit 115 forms in particular a system for safely resetting resources 130 in the system of virtual machines 200, as will be explained below with reference to FIGS. 1 and 2.

Figure 2:
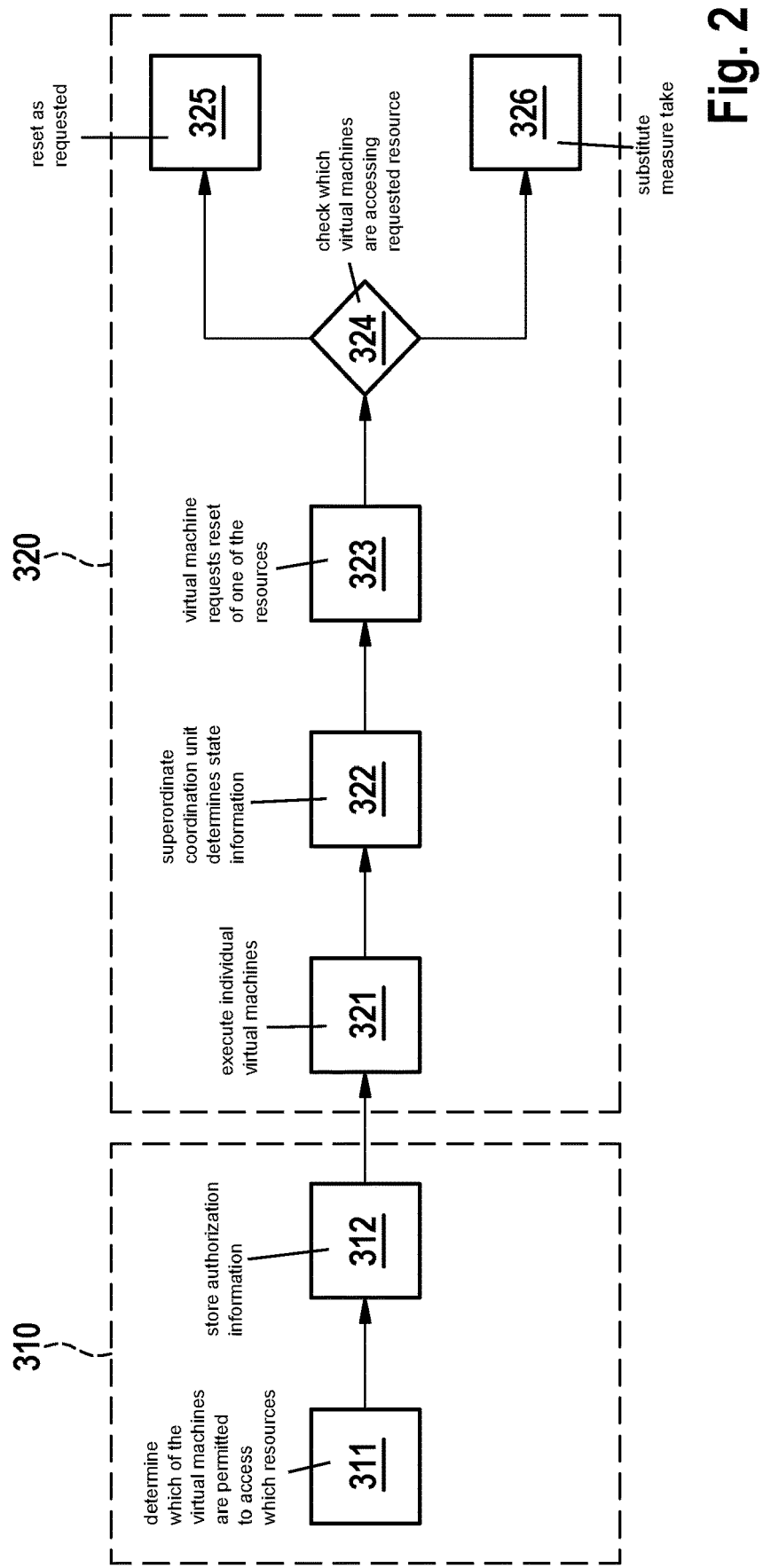
FIG. 2 shows schematically a preferred specific embodiment of the method according to the present invention as a block diagram.

FIG. 2 shows schematically a preferred specific embodiment of the method according to the present invention as a block diagram.

In the course of an initialization or configuration phase 310, it is first determined in a step 311 which of the virtual machines 200 are permitted in later regular operation of the microcontroller 100 to access which resources 130. For example, this configuration phase 310 may be carried out in the course of a manufacturing process of microcontroller 100 or during an initial operation. In step 311, firm requirements or firm access authorizations are thus defined, which do not change during a normal operation of microcontroller 100. If necessary, the predefined access authorizations may be changed for example in the course of a remote update (e.g. FOTA).

In a step 312, in accordance with the authorizations defined in step 311, corresponding authorization information is stored in coordination unit 115 as access information regarding which virtual machines 200 are permitted to access which resources 130 of the microcontroller 100. In particular, in the course of the above remote update, the corresponding authorization information is also updated in coordination unit 115.

The initialization or configuration phase 310 is followed by a regular operation or a regular run time 320 of microcontroller 100. In step 321, the individual virtual machines 200 are executed in microcontroller 100 and the virtual machines 200 access the individual resources 130 in accordance with the authorizations predefined in step 311. Of course, not all virtual machines 200 necessarily access all resources 130 assigned to them at all times during the run time.

In step 322, the superordinate coordination unit 115 determines state information as access information regarding which virtual machines 200 are currently accessing which resources 130 during the run time. For this purpose, the individual subordinate coordination units 225a, 225b, 225c may for example transmit corresponding state information concerning their respective virtual machine 200a, 200b, 220c to the superordinate coordination unit 115, in particular at regular time intervals. Alternatively, the superordinate coordination unit 115 may also read in the respective state information from the individual coordination units 225a, 225b, 225c or may query the latter. Thus, the authorization information regarding the firm access authorizations and the state information regarding the current, actual accesses are stored as access information in the superordinate coordination unit 115.

In step 323, virtual machine 200a requests for example to reset one of the resources, for example a specific processor core of the processor unit, for example, because an error or a so-called trap has occurred. When such a trap occurs or when a function is called to perform a reset, the respective base software stack 220a of virtual machine 200a hands over control by hypervisor call to hypervisor 110. For this purpose, base software stack 220a transmits a corresponding message to hypervisor 110. This message comprises as argument in particular query information, which characterize the reset of the respective processor core as well as the querying virtual machine 200a. In response to receiving this message, hypervisor 110 recognizes, on the basis of the transferred argument or the query information, that this concerns a request for a reset. On the basis of the transferred argument, it is possible to determine the reason for the request and the requesting virtual machine 200a.

In step 324, in response to the request, superordinate coordination unit 115 checks on the basis of the access information, which of the virtual machines 200 are accessing this requested resource, that is, the respective processor core. In particular, superordinate coordination unit 115 checks, on the basis of the authorization information, which virtual machines 200 are even permitted to access the processor core. Furthermore, superordinate coordination unit 115 checks, on the basis of the state information, which virtual machines 200 are currently actually accessing the processor core.

As a function of this check, coordination unit 115 either determines in step 325 that the respective processor core is reset as requested, or, in step 326, that a substitute measure is taken.

If coordination unit 115 in the course of the check determines for example that the respective processor core is assigned exclusively to the requesting virtual machine 200a or that, apart from requesting virtual machine 200a, currently no further virtual machine is accessing the processor core, then coordination unit 115 determines that the processor core may be reset without there being a risk of collision with further virtual machines. In step 325, the respective processor core is reset as requested.

If coordination unit 115 determines in the course of the check, for example on the basis of the authorization information, that the requesting virtual machine 200a is not permitted to access the respective processor core, virtual machine 200a is reset for example as a substitute measure or an error message is generated, for example as an entry in an onboard error memory of the respective virtual machine 200a.

If in the course of the check, coordination unit 115 determines on the basis of the state information for example that currently multiple virtual machines are accessing the respective processor core, then the querying virtual machine 200a is reset in step 326 as a substitute measure, for example. Alternatively, it is also possible that as a substitute measure in step 326 all virtual machines, which are currently accessing the requested processor core, are informed that the respective processor core is to be reset. If all these notified virtual machines respond to the message, then the processor core may be reset.

Figure 3:
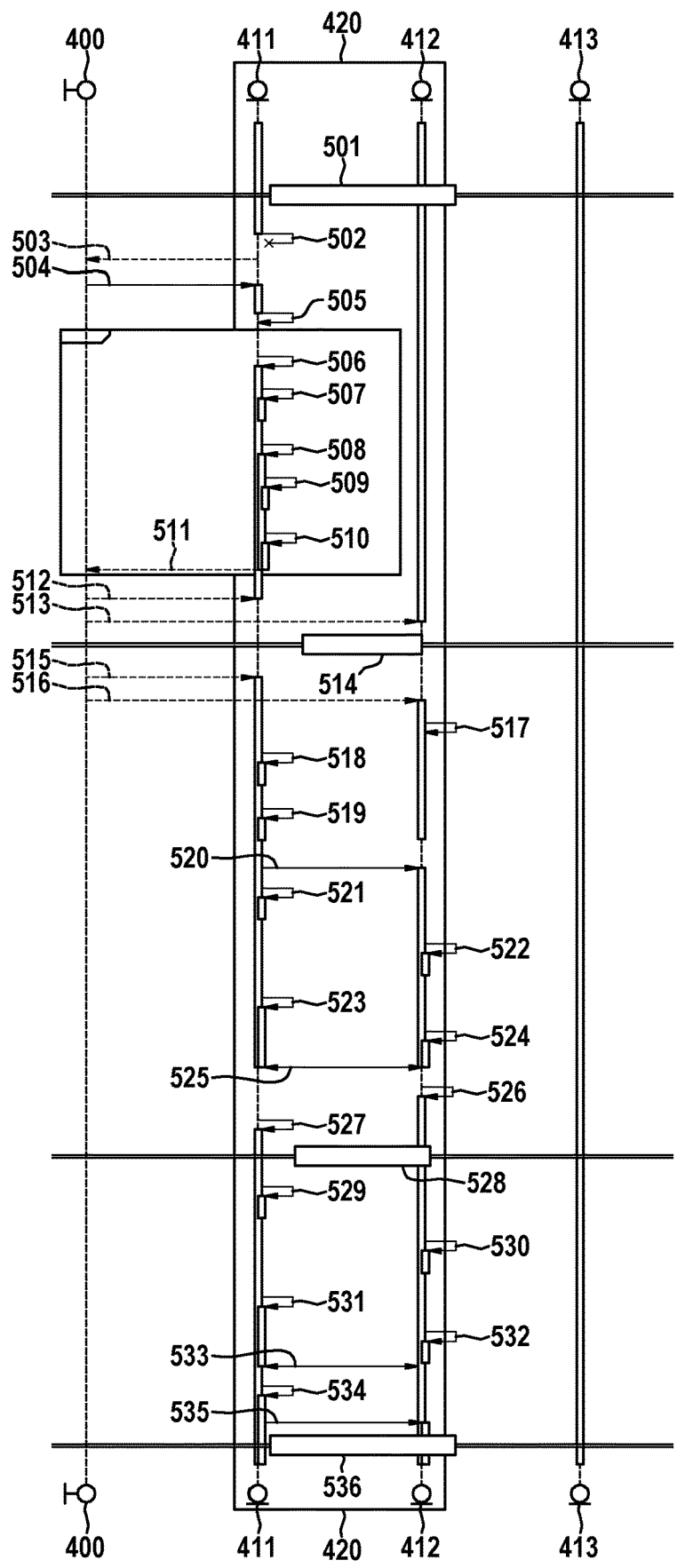
FIG. 3 shows schematically the reset of resources in a microcontroller according to a preferred specific embodiment of the method of the present invention as a schematic flow chart.

FIG. 3 shows the reset of resources in a microcontroller according to a preferred specific embodiment of the method of the present invention as a schematic flow chart.

The microcontroller is labeled by reference numeral 400 in FIG. 3 and may be designed for example in accordance with the microcontroller 100 shown in FIG. 1.

For example, a first processor core 411 and a second processor core 412 are jointly assigned to a first virtual machine, indicated by reference numeral 420. Furthermore, additional processor cores 413 may be provided as resources, which the first virtual machine is not accessing, however. These further processor cores 413 may execute further virtual machines, for example.

In step 501, in the course of the regular operation of microcontroller 400, an application software is executed in the first and second processor core 411, 412 under a respective operating system of the first virtual machine.

At a first point in time 502, an error occurs during the run time in the execution of the application software in first core 411. In step 503, microcontroller 400 is informed about the error, e.g. via a so-called "trap vector". Thereupon, in step 504, microcontroller 400 issues the instruction to handle the error, for example via a so-called "trap handler".

In step 505, the virtual machine produces a "hypervisor call" in order to request from the hypervisor that the two processor cores 411, 412 should be reset. For example, in a step 506, a program run for handling the error is generated (a so-called "process trap") at a second execution or authorization level ("execution level 2, EL2"). Information about the error is stored in step 507. In a step 508, the software applications executed in core 411 are reset. In step 509, peripheral units connected to core 411 are reset. In step 510, the logic circuit of core 411 is reset.

In step 511, the reset of cores 411, 412 is requested from the hypervisor. In particular, the coordination unit executed in the hypervisor is able to decide, whether cores 411, 412 are reset as requested. Since only this requesting virtual machine is accessing cores 411, 412, the coordination unit grants the respective request.

In step 512, the hypervisor issues the instruction to reset first processor core 411, and, in step 513, the hypervisor accordingly issues the instruction that the second processor core 412 is also reset.

In step 514, a hypervisor is started at the second execution or authorization level EL2. The hypervisor is executed in microcontroller 400 with special authorizations at second execution level EL2, in particular in order to allow for a separation of virtual machines that is safe in terms of operation and secure in terms of information, which are executed at lower execution or authorization levels ("execution level 1", EL1, or "execution level 0", EL0). Following a reset by command, microcontroller 400 always starts expediently at the highest execution or authorization level EL2, due to the implementation in its hardware.

The subsequent steps concern the restart process of processor cores 411, 412 after they were reset. At first, in step 515, first processor core 411 is defined as a primary or superordinate core having a coordination authority. In step 516, second processor core 412 is defined as a secondary or subordinate core, which is operated in dependency on primary core 411. Further, second core 412 is transferred into an infinite or wait loop, in order to wait for further instructions. Thereupon, in step 517, second core 412 is parked in the infinite loop.

In step 518, an initialization of first core 411 is started. In step 519, global components are initialized in first core 411. In step 520, first core 411 wakes up second core 412 from the infinite loop. In step 521, core-specific components of first core 411 are initialized. In a corresponding manner, core-specific components of the second core are initialized in step 522.

In step 523, the synchronization of the two cores is started in first core 411. Accordingly, in step 524, the synchronization is started in second core 412. In step 525, the two cores 411, 412 are synchronized.

In step 526, a switch is made in second core 412 to a first execution or authorization level ("execution level 1", EL1). Accordingly, in step 527, a switch is made in the first core 411 to first execution level EL1. In step 528, the first virtual machine is started at first execution level EL1.

In step 529, specific executable applications are initialized in first core 411 and, in step 530, specific executable applications are initialized in second core 412.

In step 531, the synchronization of the cores is started anew in first core 411. In step 532, accordingly, the synchronization is performed in second core 412. In step 533, the two cores 411, 412 are synchronized.

In step 534, the operating system is started in first core 411 and in step 535, the operating system is started in second core 412. Thereupon, in step 536, in the course of the regular operation of first and second processor core 411, 412, the application software is executed anew under the operating system of the respective virtual machine.

What is claimed is:

1. A method for operating a microcontroller, the microcontroller including a plurality of resources, a plurality of virtual machines being executed in the microcontroller, and the microcontroller running a hypervisor that executes a coordination function, the hypervisor being superordinate to the plurality of virtual machines, the method comprising:
storing, by the coordination function, access information that:
identifies, for each of the plurality of virtual machines, a respective one or more permissions of accesses by the respective virtual machines to one or more respective ones of the plurality of resources; and
indicates a current state of all active accesses by the plurality of virtual machines to the plurality of resources;
in response to a requesting one of the virtual machines requesting a reset of one of the resources, selecting, by the coordination function, whether to respond to the request by performing the requested reset of the resource or to instead perform a substitute measure, the selecting being performed based on (I) an access permission of the requesting one of the virtual machines to the one of the resources as indicated by the stored access information and (II) an identification of which of all of the plurality of virtual machines the current state presently indicates are accessing the one of the resources.

2. The method as recited in claim 1, wherein the coordination function determines the access information at least in part during run time of the microcontroller.

3. The method as recited in claim 1, wherein each respective virtual machine of the virtual machines respectively runs a subordinate coordination function, which are each respectively subordinate to the coordination function executed by the hypervisor.

4. The method as recited in claim 3, wherein each of the subordinate coordination functions respectively transmits a respective part of the access information concerning its respective virtual machine to the coordination function executed by the hypervisor.

5. The method as recited in claim 1, wherein, when the coordination function determines in response to the request that currently only the requesting one of the virtual machines is accessing the resource, the coordination function selects to reset the resource.

6. The method as recited in claim 1, wherein, when the coordination function determines in response to the request that currently several of the virtual machines are accessing the resource, the coordination function determines that the substitute measure is taken instead of the requested reset.

7. The method as recited in claim 1, wherein as a substitute measure, the virtual machine is reset and/or several of the virtual machines are reset and/or a message is transmitted to all of the virtual machines which are currently accessing the resource.

8. The method as recited in claim 1, wherein the coordination function receives as query for resetting the resource a message, which includes query information, which characterizes the resetting of the resource as well as the virtual machine.

9. A microcontroller including a plurality of resources, a plurality of virtual machines being executed in the microcontroller, and the microcontroller running a hypervisor that executes a coordination function, the hypervisor being superordinate to the plurality of virtual machines, the microcontroller configured to:
store, using the coordination function, access information that:
identifies, for each of the plurality of virtual machines, a respective one or more permissions of accesses by the respective virtual machines to one or more respective ones of the plurality of resources; and indicates a current state of all active accesses by the plurality of virtual machines to the plurality of resources;

in response to a requesting one of the virtual machines requesting a reset of one of the resources, select, with the coordination function, whether to respond to the request by performing the requested reset of the resource or to instead perform a substitute measure, the selecting being performed based on (I) an access permission of the requesting one of the virtual machines to the one of the resources as indicated by the stored access information and (II) an identification of which of all of the plurality of virtual machines the current state presently indicates are accessing the one of the resources.

10. A non-transitory machine-readable storage medium on which is stored instructions that are executable by a microcontroller, the microcontroller including a plurality of resources, a plurality of virtual machines being executed in the microcontroller, and the microcontroller running a hypervisor that executes a coordination function, the hypervisor being superordinate to the plurality of virtual machines, the instructions, when executed by the microcontroller, causing the microcontroller to perform the following steps:

storing, by the coordination function, access information that:

identifies, for each of the plurality of virtual machines, a respective one or more permissions of accesses by the respective virtual machines to one or more respective ones of the plurality of resources; and indicates a current state of all active accesses by the plurality of virtual machines to the plurality of resources;

in response to a requesting one of the virtual machines requesting a reset of one of the resources, selecting, by the coordination function, whether to respond to the request by performing the requested reset of the resource or to instead perform a substitute measure, the selecting being performed based on (I) an access permission of the requesting one of the virtual machines to the one of the resources as indicated by the stored access information and (II) an identification of which of all of the plurality of virtual machines the current state presently indicates are accessing the one of the resources.

* * * * *